(12) United States Patent
Fumagalli et al.

(10) Patent No.: US 7,092,633 B2
(45) Date of Patent: Aug. 15, 2006

(54) SYSTEM AND METHOD FOR CONFIGURING OPTICAL CIRCUITS

(75) Inventors: Andrea Fumagalli, Dallas, TX (US); Qingzhong Cai, Plano, TX (US)

(73) Assignee: University of Texas System Board of Regents, Austin, TX (US)

( * ) Notice: Subject to any disclaimer, the term of this patent is extended or adjusted under 35 U.S.C. 154(b) by 559 days.

(21) Appl. No.: 10/003,005

(22) Filed: Nov. 14, 2001

(65) Prior Publication Data

US 2002/0126343 A1 Sep. 12, 2002

Related U.S. Application Data

(60) Provisional application No. 60/248,265, filed on Nov. 14, 2000.

(51) Int. Cl.
*H04B 10/20* (2006.01)

(52) U.S. Cl. .............................. 398/59; 398/58; 398/66; 398/67; 398/68; 398/70; 398/71; 398/72; 398/79; 398/98; 398/99; 398/19; 398/34; 398/51; 398/54; 370/230; 370/254; 370/235; 370/437; 370/229; 370/428; 370/429; 370/255

(58) Field of Classification Search .................. 398/51, 398/58, 57, 59, 54, 19, 34, 66, 67, 68, 70, 398/71, 72, 79, 98, 99; 370/230, 254, 428, 370/429, 235, 437, 229, 255
See application file for complete search history.

(56) References Cited

U.S. PATENT DOCUMENTS 5,781,537 A * 7/1998 Ramaswami et al. ....... 370/254
6,671,256 B1 * 12/2003 Xiong et al. ................ 370/230
6,741,572 B1 * 5/2004 Graves et al. .............. 370/254

FOREIGN PATENT DOCUMENTS

| WO | WO 88/00971 | 2/1988 |
|---|---|---|
| WO | WO 96/11279 | 4/1996 |
| WO | WO 98/17799 | 4/1998 |
| WO | WO 99/32147 | 7/1999 |

OTHER PUBLICATIONS

Ling Xu et al., XP-002131515, *Immunization For Ebola Virus Infection*, Jan. 1998, pp. 37-42.
Ruff A. Nelle et al. XP 001053714, *Improved DNA Vaccines Against Ebola Virus*, pp. 330-331.
Jean-Luc Imler, *Adenovirus Vectors As Recombinant Viral Vaccines*, Vaccine 1995 vol. 13 No. 13, pp. 1143-1151.
Lorna Vanderzanden, et al., XP-002131516, *DNA Vaccines Expressing Either the GP or NP Genes of Ebola Virus Protect Mice From Lethal Challenge*, 1998, pp. 134-144.
Gaetano Romano et al., XP-002190944, *Latest Developments in Gene Transfer Technology: Achievements, Perspectives, and Controversies over Therapeutic Applications*, 2000, pp. 19-39.
V. Randrianarison-Jewtoukoff et al., XP-002190945, Recombinant Adenoviruses as Vaccines, 1995, pp. 145-157.

* cited by examiner

*Primary Examiner*—Hanh Phan
(74) *Attorney, Agent, or Firm*—Jenkens & Gilchrist, P.C.

(57) ABSTRACT

A system and method for configuring lightpaths within an optical circuit wherein the source node stores requests for a lightpath between the source node and the destination node. Upon receipt of a token at the source node indicating an available space within a wavelength, the source node selects a request stored within the queue based upon a best fit window protocol. A lightpath is then established between the source node and the destination node responsive to a selected request.

29 Claims, 4 Drawing Sheets

SYSTEM AND METHOD FOR CONFIGURING OPTICAL CIRCUITS

RELATED APPLICATION(S)

This application claims priority from and incorporates herein by reference the entire disclosure of U.S. Provisional Application Ser. No. 60/248,265 filed Nov. 14, 2000.

TECHNICAL FIELD

The present invention relates to the configuration of optical circuits, and more particularly, to the use of a multi-token control mechanism to configure optical circuits on demand.

BACKGROUND OF THE INVENTION

The insatiable appetite for Internet connectivity and network applications drives the current explosion of network traffic volume worldwide. It is expected that this exponential growth of traffic volume will continue in the foreseeable future. Optical fiber communication technology based on Wavelength Division Multiplexing (WDM) has been employed as the major means to cope with the traffic volume growth. While WDM technology has already revolutionized the backbone network by enabling unprecedented increases in the leveraged capacity of a single fiber, a parallel paradigm shift is now taking place in the metropolitan network.

One of the most critical challenges in designing today's access and metropolitan networks is the fact that bandwidth demands have been consistently exceeding the most aggressive network planning predictions. In addition, the individual user's traffic burstiness makes static bandwidth reservation (e.g., SONET/SDH like) neither bandwidth efficient nor adequate to delay sensitive traffic. This situation has generated an increasing interest towards all-optical networks that are capable of allocating network resources, i.e., bandwidth, in a dynamic way. Such networks must be able to reserve the necessary bandwidth on-demand to allow the transmission of a user's traffic burst. Once the burst transmission is completed, the reserved bandwidth is promptly released to be made available to other burst transmissions.

In order to be of practical use, the bandwidth on-demand concept requires few but fundamental features. Three of the features are:

fast set-up time of the optical circuit (or lightpath);

fair blocking probability irrespective of the lightpath span (or the number of fiber lines the lightpath is routed through)

good bandwidth efficiency, i.e., the fraction of reserved bandwidth actually used to transmit data.

To understand how challenging it is to achieve these three features at once in the same architecture, one must observe that user requests for a lightpath are unpredictable and may occur simultaneously at distinct and geographically separated nodes. As a result, concurrent lightpath requests will compete to secure common resources, i.e., the available wavelengths in the network. This may result in a number of reservation attempts being failed as they are blocked by other lightpath requests that book the resources first. In this scenario, it is thus possible to incur in long set-up times and unfair blocking probabilities that are a function of the lightpath span. Lightpaths with longer spans are more likely to be blocked since they require successful wavelength reservation on each and every fiber line they are routed through.

Solutions so far proposed to solve the problem of routing and wavelength assignment (RWA) to establish lightpaths dynamically in a WDM ring can be categorized as centralized approaches and distributed approaches. With a centralized approach, the source node sends the request for a lightpath to a special node called controller. The controller keeps track of the available network wavelengths and serves the node requests on a first-come-first-serve (FCFS) basis. The resource contention is resolved at the controller. On a unidirectional ring, latency of the signaling required between the source and the controller to set up and eventually tear down the lightpath is proportional to the ring latency, i.e., round trip propagation time within the ring, and may considerably delay the set-up time and reduce bandwidth efficiency in metro applications.

With a distributed mechanism, every node solves the RWA problem for its own newly requested lightpaths. One way to achieve this objective is to allow every node to keep track of network-wide wavelength availability. The RWA problem is solved based on shared global information. In another approach, each node makes use of a routing table for each wavelength which specifies the next hop and the cost associated with the shortest path to each destination on this wavelength. Since different nodes may concurrently try to assign the same wavelength to distinct lightpath requests, both approaches require at least one round trip time from source to destination to be assured that their reservation was completed successfully. In a unidirectional ring this time equals the ring round trip time.

SUMMARY OF THE INVENTION

The present invention overcomes the foregoing and other problems with an optical network consisting of a source node and a destination node which are interconnected by a plurality wavelength, wherein each of the plurality of the wavelengths is associated with a particular channel. A token is associated with each of the plurality of wavelengths and indicates the availability of the wavelengths for supporting a lightpath. The source node is configured to store a request for a lightpath between the source node and a destination node. Upon receipt of a token at the first node indicating an available space within the wavelength associated with the token, a request is selected from the queue using a best fit window protocol. A connection is then established responsive to the selected request between the source node and the destination node.

The selection process would consist of determining whether any requests within the queue having expired soft deadlines and selecting a largest request having an expired soft deadline which will fit within the available space of the wavelength for connection if any exist. If no soft deadline expirations are present, a largest request which will fit within the space available on the wavelength is selected. The selected request is used to establish a connection.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
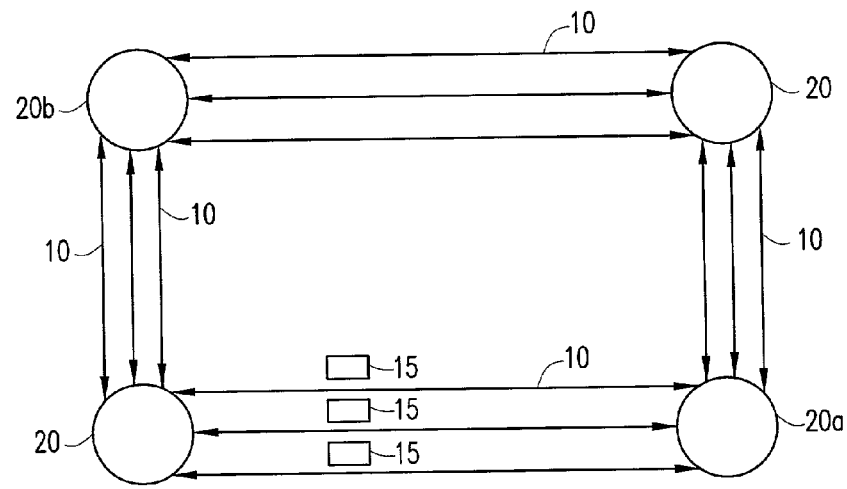
FIG. 1 generally illustrates the implementation of the system and method of the present invention.

Referring now to the drawings, and more particularly to FIG. 1, where there is provided a general illustration of the system of the present invention. The Lightring architecture of the present invention resorts to a unique distributed multi-token based control wherein access to each wavelength 10 (channel) is controlled by a wavelength specific signaling-token 15 that is circulated among each node 20 on a ring 25 in a round robin fashion. For each data wavelength, a control message or token is continuously circulated among the nodes using the control channel. Tokens 15 regulate the access to the corresponding wavelength 10 and inform the source of the ring 25 available resources (wavelengths). Tokens 15 bear resource availability information and broadcast this information to each node 20 in the ring network 25. This enables each node 20 of the ring network 25 to have an updated view of network resources. Upon reception of a token 15, a source node 20a with an outstanding lightpath request checks the available resources on the wavelength 10 associated with the token 15 and verifies if the outstanding lightpath can be set up on that wavelength. If so, the token 15 is updated and passed onto the adjacent downstream node to inform all the other nodes 20 that a lightpath has been established and some resources have been reserved on that wavelength. A lightpath is set up between two nodes 20 on a given wavelength only when a token 15 is acquired by a source node 20a. Similarly, for lightpath take-down, the token corresponding to the wavelength of the lightpath will be updated by the source to inform the other nodes of what resources have been freed. While circulating along the ring 25, tokens 15 broadcast lightpath status information on other connections to each node 20 on the ring 25.

Figure 2:
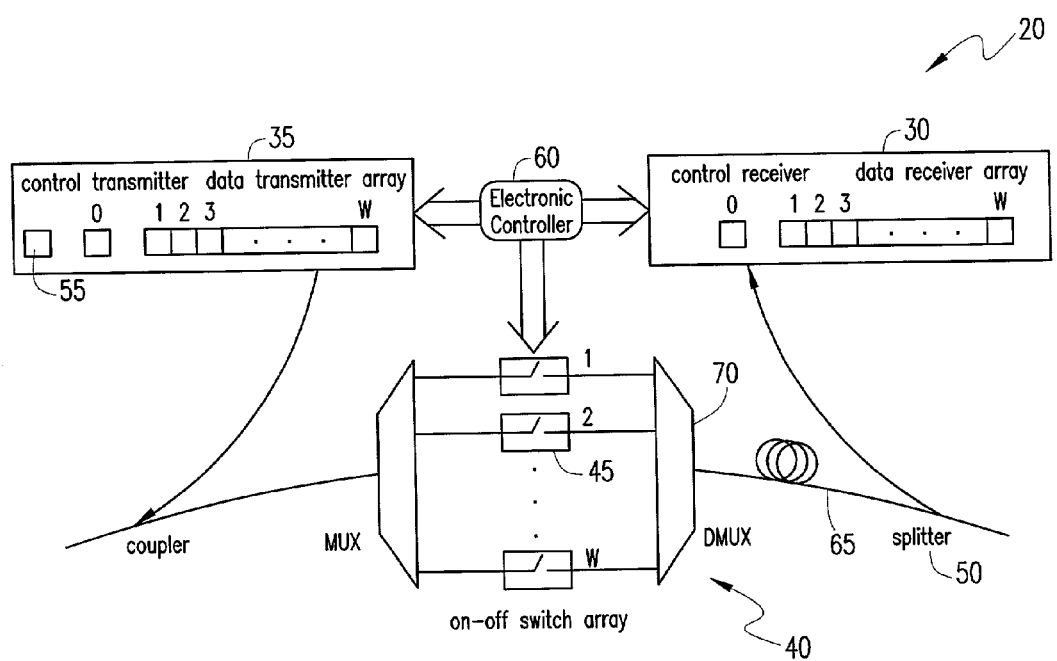
FIG. 2 illustrates source and destination nodes within an optical ring network.

Referring now also to FIG. 2, the network under consideration is a single fiber ring network 25 that connects N nodes 20. The network makes use of W data channels and one control channel, for a total of W+1 wavelengths 10. Each wavelength supports one data channel. The optical signal on the control channel does not go through the node 20 and it is separately handled by a control receiver 30 and a control transmitter 35. For each data channel a node 20 has one fixed control transmitter 30, one fixed control receiver 35 and one optical switch 40. This architecture allows the node 20 to transmit and receive message independently (and simultaneously) on any data channel. The on-off switches 45 within the optical switch 40 are used to control the flow of optical signals through the node 20 and prevent signal re-circulation in the ring 25. A transmission buffer 55 is also provided at each node 20 to queue the generated packets prior to their transmission into the ring 25. The nodes 20 activities are regulated by an electronic controller 60 that determines the state for each on-off switch 45, the message transmission time, the wavelength used, and the reception of the incoming messages. The electronic processing is done in parallel while the optical signal propagates through the fiber delay line 65 that connects the splitter 50 to a demultiplexer 70.

Once transmitted by the source node 20a, the message is removed from the network by the destination node 20b. Any uncollected section of the message, due to the setup of the optical switch at the destination node 20b, will make a round trip and be collected by the source node 20a. An optical copy of the message is obtained at every node 20 using a splitter 50, thus realizing a "broadcast and select" system. Only the intended destination(s) of the message actually receives the message.

Referring now back to FIG. 1, in the present architecture, access to each wavelength 10 is controlled by a dedicated token 15 that is cyclically circulated among the nodes. Each data channel (i.e., wavelength) is associated with one token that is circulated among the nodes 20 in the control channel and regulates the access to the corresponding channel. Thus, a total of W tokens 15 are available in the ring. A lightpath between a source node 20a and a destination node 20b may be set up and torn down only when a token 75 is acquired by the lightpath source node 20a. The token 15 is used to broadcast the wavelength status to all nodes 20 in a ring 25 and indicate whether there is available space on a wavelength 10. Since only one node 20 at a time is allowed to make a reservation on each wavelength, the protocol of the present system achieves a "tell-and-go" reservation mechanism that is always successful. While circulating along the ring 25, tokens 15 broadcast the source 20a and destination node 20b of the newly established lightpath to all nodes 20 of the ring 25 so that no other node 20 will attempt to set up a lightpath on the same wavelength 10 that overlaps in space with the one being established. Global lightpath status information of the moment is thus maintained on each node 20. This information can be stored in a memory (not shown) associated with each node 20.

If a strict first come first serve (FCFS) service policy is used on the message queue of each node 20, the system inclines to penalize the lightpath requests with longer spans when the offered load becomes high due to the space limit on the ring regarding a channel. Therefore, lightpath requests with long spans will hold up all the traffic behind it in the queue. Based on this observation, a Best-Fit Window (BFW) mechanism is used to achieve better network throughput.

Contrary to all conventional wavelength assignment algorithms whereby an available (somehow optimal) wavelength is sought for each given lightpath request, the LightRing protocol seeks the lightpath request in the Beat-Fit-Window (BFW) of the transmission queue that optimally fits the available space of the network on a given wavelength (identified by the arriving token) at the arrival time of the token. Any lightpath request in BFW of the transmission queue is a possible candidate to be transmitted based on the result of selection. The bandwidth efficiency achieved by the proposed reservation mechanism is proportional to the number of requests that the reservation mechanism can choose from, thus it is proportional to the size of BFW. Complexity of the LightRing reservation mechanism is proportional to the size of BFW and not a function of the number of wavelengths (most of the existing reservation mechanisms have complexity that is proportional to the number of wavelengths). The LightRing reservation mechanism thus scales well when the number of wavelengths increase.

Figure 3:
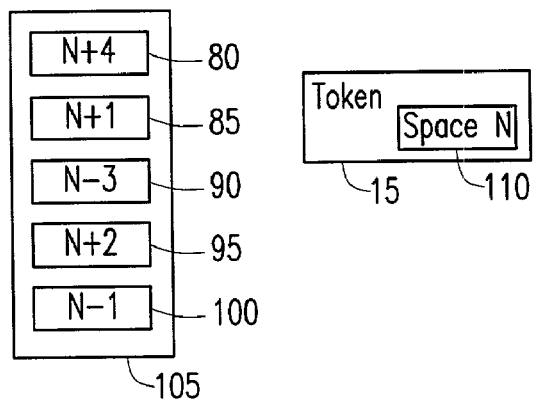
FIG. 3 illustrates the application of the best fit window approach of the present invention.

When a token 15 arrives, the best-fit message, which is the message with the longest span that can fit into the available space on the channel corresponding to the token, will be chosen and transmitted. Thus, as seen in FIG. 3, where message requests 80–100 are waiting in the queue 105, and a space 110 having a length N is available in a requested channel, message request 100 is selected for the space 110 because it is the request with the longest span capable of fitting in the available space.

In order to avoid starvation and guarantee fairness for the requests with different span lengths, a soft deadline is applied to each lightpath request so that the request will be dropped outside of BFW mechanism if the waiting time of the request is longer than a certain value. To maintain fairness of the system, requests are not dropped in the BFW mechanism. Instead, a FCFS protocol is applied to a request that has reached its soft deadline and the request is transmitted in the next available space. In other words, once a request gets into BFW, it has to be transmitted sooner or later.

Following is an explanation of each variable used in the protocol description.

$r_i$: ith lightpath request,
$R_{T \times Q}$: $\{r_i | r_i$ in transmission buffer of a node$\}$;
$R_{BFW}$: $\{r_i | r_i \in R_{T \neq Q}, 0 \leq BFW\}$;
$R_{T \neq Q-BFW}$: $\{r_i | r_i \in R_{T \neq Q}, r_i \notin R_{BFW}\}$;
t: current time;
$t_i^{(a)}$: arrival time of $r_i$ in $R_{T \neq Q}$ (the time that $r_i$ is inserted into the transmission queue);
$t_i^{(S)}$: beginning of the service time of $r_i$ (the time $r_i$ is removed from the transmission queue);
$t_j^{(t)}$: arrival time for token j;
$t_i^{(q)}$: time spent by $r_i$ in $R_{T \neq Q}$;
$t_i^{(w)}$: time spent by $r_i$ in $R_{BFW}$;
$e^{(w)}(t)$: estimated average time spent by $r_i$ in $R_{BFW}$ as the function of t;
$d_7$: soft deadline for serving lightpath request $r_i$;
$d^{(w)}(t)$: soft deadline for $r_i$ leaving $R_{BFW}$; this value is based on the average time spent in the BFW.
$R_{LATE}$: $\{r_i | r_i \in R_{BFW}, t_i^{(w)} > d^{(w)}(t)\}$;
$l_j(i)$: the number of available hops left when $r_i$ is placed into the space available on channel j; negative number indicates the number of hops that $r_i$ exceeds the available space gap.
Fit$(R, \lambda_j)$: $\{r_i | r_i \in R, l_j(i) \geq 0\}$;
BestFit$(R, \lambda_j)$: $\{r_i | r_i \in R, l_j(k) \geq l_j(k) \geq l_j(i), $ for $\forall r_k \in R - r_i\}$;
FCFS(R): $\{r_i | r_i \in R, t_j^{(a)}, $ for$\forall r_k \in R - r_i\}$;

The following rules are applied to the protocol:
(1) only $r_i$ in $R_{BFW}$ can be served upon a token's arrival;
(2) only $r_i$ in $R_{T \times Q-BFW}$ may be dropped due to the soft deadline applied, so that once $r_i$ gets into $R_{BFW}$, it has to be served eventually;
(3) arriving requests are dropped when no space is available in transmission buffer;

The protocol used on a node can be described according to the following pseudocode. However, it should be realized that other implementation of code are possible.

1. Upon arrival of token j, $t = t_j^{(t)} -$
  set up lightpath for request $r_i$
  If (Fit$(R_{LATE}, \lambda_j) \neq \Phi)\{$
    $r_i = $FCFS(fit$(R_{LATE}, \lambda_j)$)
    release token j with current lightpath info
    transmit $r_i$
  $\}$ else if(Fit$(R_{BFW}, \lambda_j) \neq \Phi\{$
    $r_i = $BestFit$(R_{BFW}, \lambda_j)$
    release token j with current lightpath info
    transmit $r_i$ $\}$ else
  pass token j to next node;

2. Upon beginning of servicing of arrival of $r_i$, $t = t_i^{(j)} -$
  i) remove $r_i$ from $R_{T \neq Q}$ and $R_{BFW}$;
  ii) set $e^{(w)}(t) = \beta e^{(w)} t_{i-1}^{(j)} + (1-\beta) t_i^{(w)}$, where $\beta$ is a system parameter of estimator $e^{(w)}$, with value less than 1 but close to 1;
  iii) set $d^{(w)}(t) = \alpha e^{(w)}(t)$, where $$a = \frac{d(w)(t)}{e(w)(t)}$$

is the margin above average value for $r_i$ spent in $R_{BFW}$. $\alpha$ is greater than 1 but close to 1;
  iv) drop requests that past the soft deadline, which are $\{r_i | r_i \in R_{T \times Q-BFW}, t_i^{(q)} > d_{(q)} - e^{(w)}(t)\}$.

There are two fairness issues in the system of the present invention. The first issue is the fairness for the lightpath requests with different lengths in time. Since the incoming lightpath request has exponential distribution on duration, this fairness issue is resolved automatically. This is true even when BFW is used because the request selection is totally independent from lightpath duration.

The second issue is the fairness for the lightpath requests with different spans (or distances) on the ring. When FCFS policy is used, this fairness issue is also resolved automatically due to the uniform traffic distribution. But when BFW is used in the network, the simulation results confirm this fairness is no longer guaranteed. This is simply due to the fact that we do not randomly select requests in BFW regarding span length.

The way we tackle this problem is to apply a soft deadline $d^{(w)}(t)$ to each lightpath request in BFW, where $d^{(w)(t)}$ is described above as a common filter with system parameter $\alpha$ and $\beta$. Any request with the time spent in BFW greater than $d^{(w)}(t)$ is considered late and will be transmitted in the fashion of FCFS. The closer is the value of $\alpha$ to 1, the tighter is the constraint and in turn more observed is the fairness. The closer the value of $\beta$ to 1, the slower the common filter reacts to input change.

If a hard deadline is applied to each lightpath request, the overdue request has to be dropped no matter it is in BFW or not. Because of the non-random selection of request in BFW for transmission, if the overdue request is dropped in BFW, the blocking probability will no longer be the same for the requests with different lengths of span. Therefore the fairness can not be maintained any more. Based on this observation, we change to drop the overdue request right outside of BFW to maintain a soft deadline $d_q$. Since the estimated average waiting time $e^{(w)}(t)$ is kept for record anyway, $d_q - e^{(w)}(t)$ can be used to check if we need to drop the request right outside of BFW when BFW has an empty spot to be filled. Therefore, in order to achieve the fairness o blocking probability only a soft deadline $d^{(q)}$ can be applied.

Figure 4:
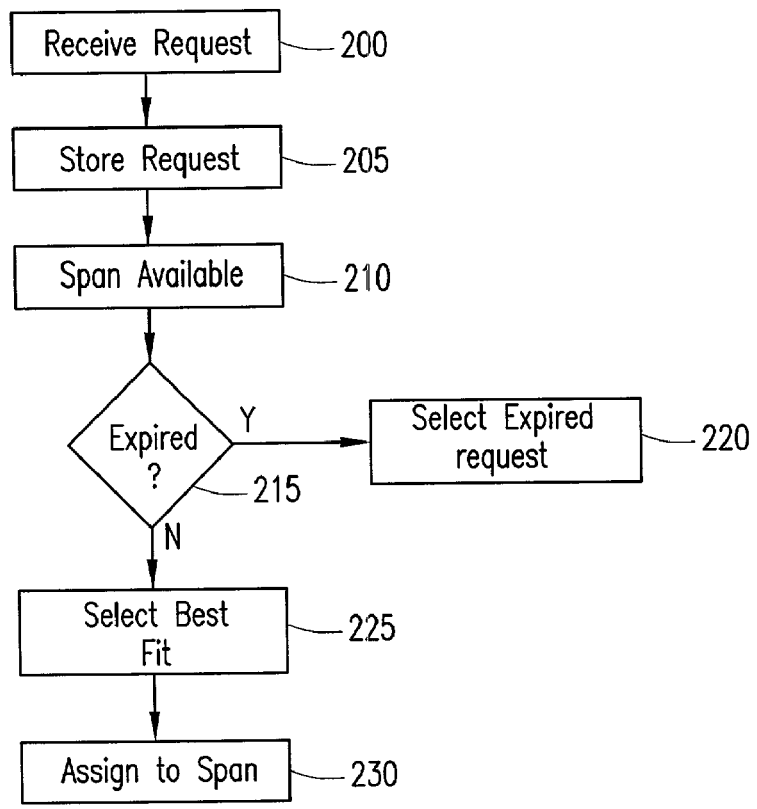
FIG. 4 is a flow diagram illustrating the method of the present invention.

Referring now to FIG. 4, there is illustrated a flow diagram generally describing the process for assigning a request to a provided span within a channel. A token requesting establishment of a lightpath between a source node and a destination node is received at step 200. The request stored at step 205 within the nodes queue. An indication of an available span is received at step 210 from another token. Inquiry step 215 determines whether any soft deadlines for any requests within a node queue have expired.

If so, the first received request which will fit within the span and has an expired soft deadline is assigned to the span at step 220.

If inquiry step 215 determines that no request has exceeded their soft deadline, the span is compared to each message within the queue to select a best fit at 225. A best fit will comprise the request with the longest span which will fit within the available span length. The selected message is assigned to the span at step 230 so that a lightpath may be established.

Analytical Models

In order to see the intrinsic difference between the normal centralized WDM ring with dynamic finite duration lightpath requests and the distributed architecture proposed herein, a model for each case is presented. Due to the complexity of modeling LightRing with BFW>1, we only consider the case when BFW=1 and provide the simulation result for BFW=40.

Our analysis extends the blocking probability model described in R. A. Barry and P. A. Humblet, "Models of Blocking Probability in All-Optical Networks with and without Wavelength Changers," IEEE JSAC, Vol. 14, No. 5, June 1996, which is incorporated herein by reference, to capture the characteristics of dynamic traffic with finite duration. Barry's model introduces the qualitative behavior of the traffic for circuit-switched all-optical networks which can be used to calculate the blocking probability along a path. Yet the model does not cover the situation that lightpaths can be dynamically established and taken down. The major variable Barry's model include $P_1$, the probability a lightpath ends and drops out at a node, and $P_n$, the probability a lightpath starts at a node on an available wavelength. The result is $$P_n = \frac{\rho P_1}{1 - \rho(1 - P_1)} \quad (1)$$

where $\rho$ is the utilization. The blocking probability without wavelength converter is $$P_1 = 1 - (1 - P_n)^{RF} \quad (2)$$

where H is the number of hope of the lightpath and F is the number wavelengths in each fiber.

In the case of unidirectional WDM ring, $P_1$ is 1/N. In order to obtain the achievable throughput regardless the duration of the lightpaths, we can use the iteration technique due to the fact that $y = P_b^1 - P_b$, where $P_b^1$ is the result of iteration using $P_b$, is a monotonous function. Under maximized network load, here are the steps to find the blocking probability $P_b$ in interaction working on y–$P_b$ plan:

1. set networth load d=1, $P_{b0}$=0 and $P_{b1}$=1;
2. $\rho 0 = d(1-P_{b0})$; $\rho 1 = d(1-P_{b1})$;
3. get new $P_{b0}^1$ and $P_{b1}^1$ using Esq. 1 and 2;
4. y0=$P_{b0}^1 - P_{b0}^1$; y1=$P_{b1}^1 - P_{b1}$;
5. connect the point ($P_{b0}$, y0) and ($P_{b1}$, y1) with a straight line and find out the $P_b$ that the line across the $P_b$ axis;
6. y=$P_b^1 - P_{b1}$ where $P_b^1$ found using Eq. 1 and 2; if y has the same sign as y0, $P_{b0}$ is replaced by $P_b$, otherwise $P_{b1}$ is replaced by $P_b$;
7. go back to step 2 until |y| is less than a certain predetermined value;

Due to the establishment cost of lightpath with finite duration under both distributed and centralized control mechanism, the real achievable throughput (thr) becomes $$thr = E[\eta_\alpha](1-P_b) \quad (3)$$

where $E[\eta(\alpha)]$ is the average cost factor between the virtual throughput (1=$P_b$) and the real throughput (thr) for the average lightpath duration $\alpha$.

Centralized Approach

With a centralized control mechanism, the source node sends the request for a lightpath to a special node called the controller. The controller keeps track of the available network wavelengths and serves the nodes' requests on a FCFS basis. Once the requested lightpath is assigned a wavelength, the controller instructs the nodes that will wet up the optical add-drop multiplexers to establish the lightpath. The extra cost for setting up lightpath is always one round trip delay. Therefore assuming the burst message length has exponential distribution, the cost factor is $$E[\eta(\alpha)] + \int_0^\infty \frac{t}{D+t} \frac{1}{a} e^{-t/a} dt \quad (4)$$

where D is the ring latency.

Distributed Approach

In the proposed distributed Lightring protocol, the extra cost resides at the extra waiting time for the same token to come back to the source node when take down the lightpath. This is based on the assumption that no switching time is needed during the lightpath setup. Therefore the total time the lightpath in place is the multiple time of round trip delay that is immediately greater than the real lightpath duration $\alpha$.

$$E[\mu(\alpha)] = \sum_{n=0}^\infty \int_{nD}^{(n+D)} \frac{t}{(n+1)D} \frac{1}{a} e^{-t/a} dt \quad (5)$$

$$= \sum_{n=0}^\infty \frac{a}{D(n+1)} (e^{-nD/a} - e^{-(n+1)D/a}) +$$

$$\sum_{n=0}^\infty \frac{1}{n+1} (ne^{-nD/a} - (n+1)e^{-(n+1)D/a})$$

$$= 1 + \left(e^{D/a} + \frac{a(1-e^{D/a})}{D}\right) \ln(1 - e^{-D/a})^5$$

Performance Results

The performance results presented are produced from the simulation model implemented in C++ and the analytical model described above. Unless indicated explicitly, the network under consideration is a WDM ring with 32 wavelengths and 16 nodes evenly distributed over 80 km of fiber. Each wavelength supports a fixed transmission rate of 10 Gbps. For demonstration purposes, we assume the network traffic has Poisson arrival rate and lightpath duration is exponentially distributed. Traffic is uniformly distributed, meaning that the source and the destination nodes of a newly generated message are randomly chosen.

Figure 5:
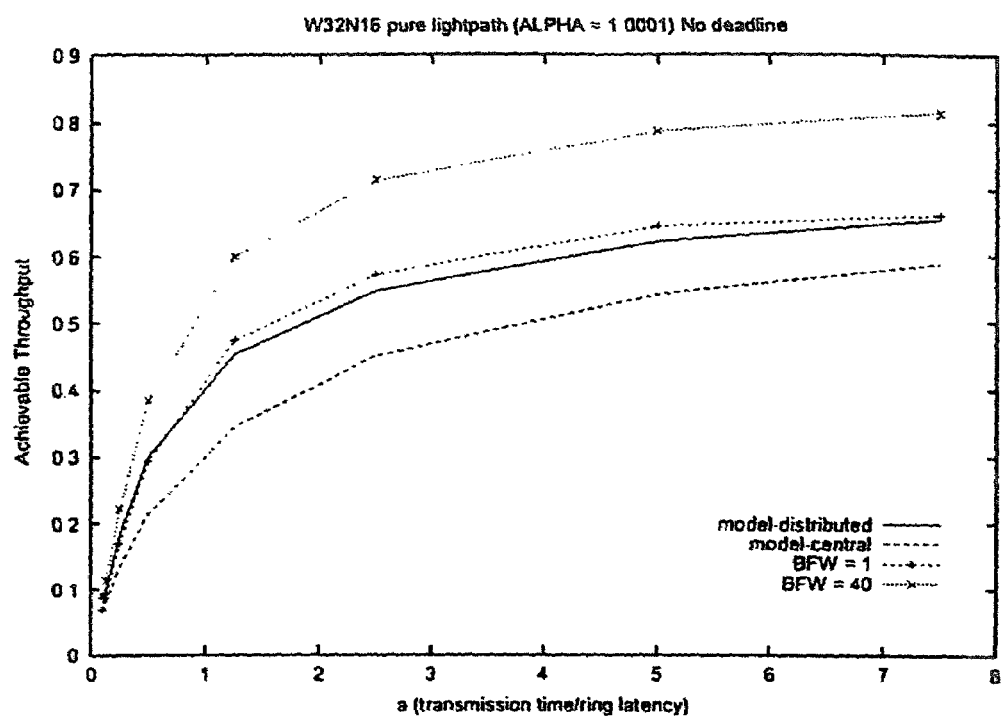
FIG. 5 illustrates the achievable node throughput versus the average lightpath duration in a multiple ring latency for a centralized and distributed lightring analytical model.

FIG. 5 depicts the achievable node throughput vs. the average lightpath duration in the multiple of the ring latency for the centralized and distributed LightRing analytical model presented above and the simulation result of the LightRing protocol with BFW=1 and BFW=40. The distributed model has BFW=1, it fairly closely matches the simulation result with BFW=1. As we can see when burst is not too large, LightRing clearly outperforms the centralized approach. Theoretically, the two curves will converge when the burst size approaches infinity. Also when BFW size increases, bandwidth efficiency is also improved.

Figure 6:
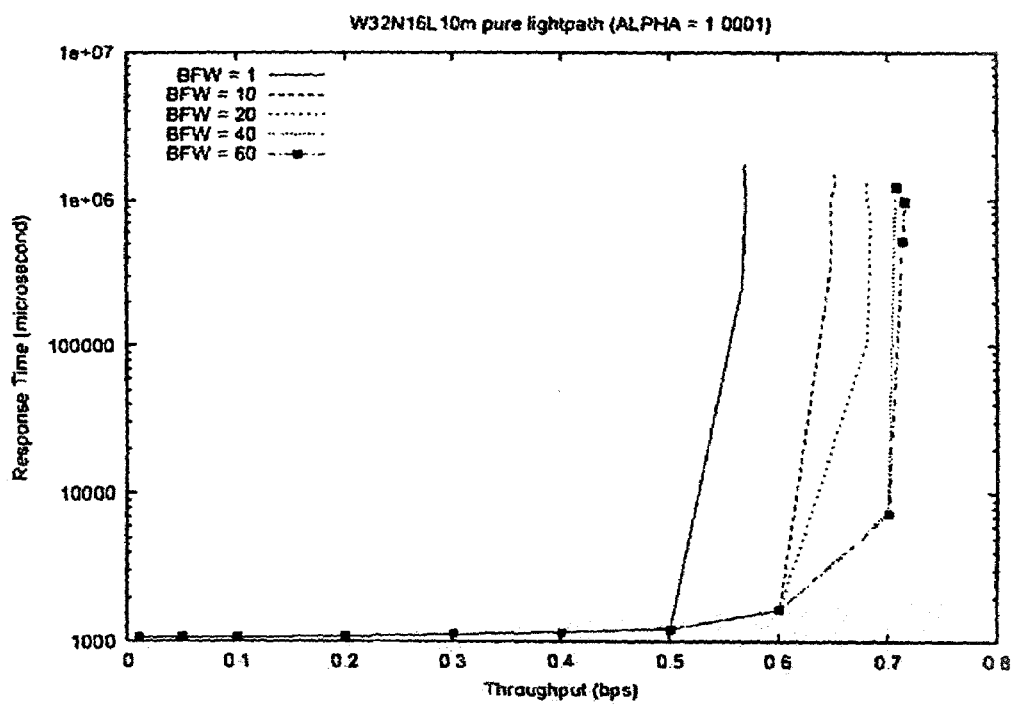
FIG. 6 illustrates the relationship between response time and throughput when using different sizes of a best fit window.

FIG. 6 shows the relationship between the response time and throughput when using different sizes of BFW. Response time is defined as the summation of the waiting time in queue and the transmission time. The average message length is 10 Mbit. The performance improvement of using larger BFW occurs under medium to heavy load. The improvement is the most obvious when BFW first picks up and becomes less obvious later.

As FIG. 6 shows, response time and control complexity can be traded for bandwidth efficiency by varying the BFW size. It is also noticed that when the network load is not too heavy, the response time can be well below the summation of the ring latency and the average burst duration (in this case, it is 1.4 msec). In other words, the time to establish a lightpath can be well below the ring latency as opposed to the case for existing centralized and distributed reservation mechanisms that needs at least the ring round trip time.

Figure 7:
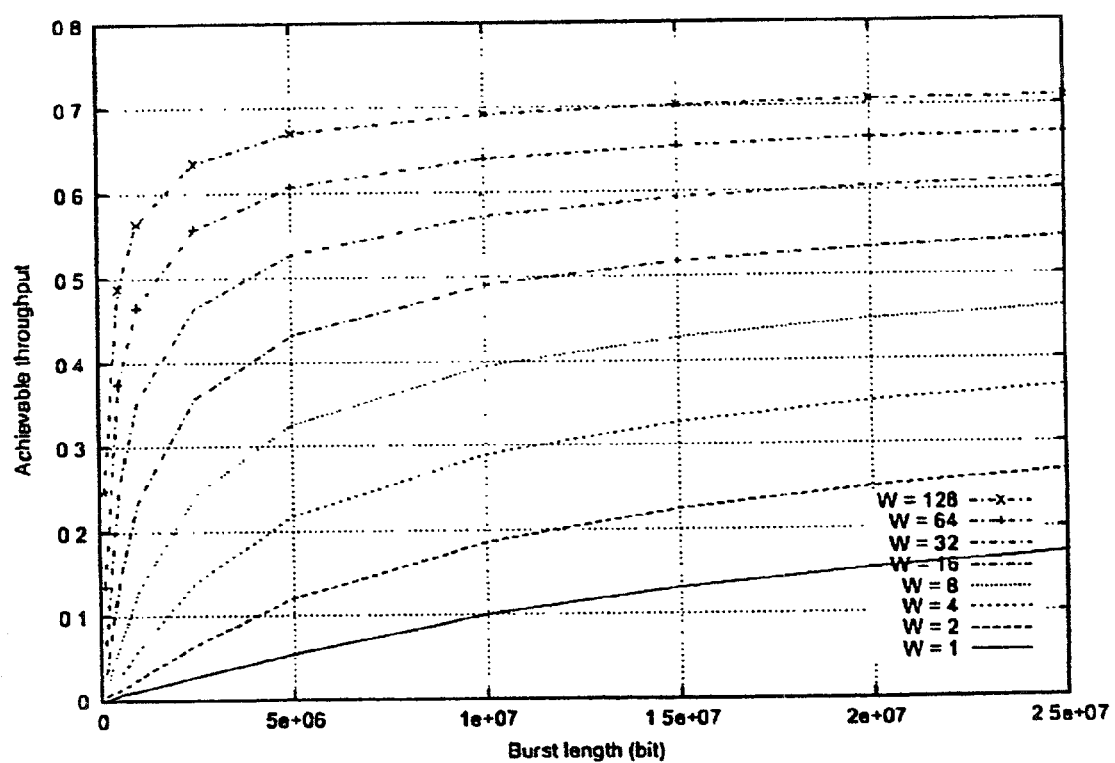
FIG. 7 illustrates achievable throughput for different burst sizes when using a different number of channels.

Based on the LightRing protocol, FIG. 7 shows the achievable throughput for different burst sizes when using a different number of channels. The result is based on the analytical model described above. The total bandwidth is fixed to 80 Gbps, so that when the number of channels increases, the transmission rate for each individual channel will decrease. That implies lower costs for the transmitter and receiver, assuming cost has more than linear growth while transmission speed increases. But more importantly FIG. 7 indicates better bandwidth efficiency when the number of channels increase. This is due to the fact that a node acquires tokens more frequently and more space to set up a lightpath.

Finally, the blocking probability for the lightpaths with a different number of hops is completely fair in LightRing due to the uniform traffic, and the fact that late messages are removed from the transmission queue only outside of BFW.

The LightRing architecture was presented in which a multi-token based reservation mechanism is used to set up lightpaths on-demand. By performing a tell-and-go reservation of the wavelengths, the LightRing approach yields fast set-up time and efficient bandwidth utilization even in presence of relatively short bursts of data, e.g., bursts whose transmission time is 1 ms in a 80 km ring.

Among other interesting features, the LightRing architecture is compatible with optical packet switching, and its performance improves with the number of wavelengths, consistently with the current trend of optical technologies. Complexity of the reservation mechanism is not a function of the number of wavelengths, and can be varied to trade response time for bandwidth efficiency. Finally, the LightRing approach is compatible with emerging protocols for bandwidth reservation in the optical layer, e.g., MP$\lambda$S, and yields fair blocking probability irrespective of the lightpath span.

The previous description is of a preferred embodiment for implementing the invention, and the scope of the invention should not necessarily be limited by this description. The scope of the present invention is instead defined by the following claims.

What is claimed is:

1. A method for establishing lightpaths within an optical ring network, comprising:
   storing a plurality of requests for a lightpath between a source node in the optical ring network and a destination node in the optical ring network in a queue at the source node;
   circulating a plurality of tokens on the optical ring network, the plurality of tokens comprising a token associated with a wavelength;
   wherein the token is adapted to indicate available resource and space on the wavelength and broadcast availability information across the optical ring network;
   receiving the token at the source node;
   based upon the availability information,
   selecting a lightpath request from the plurality of requests in the queue of the source node;
   updating the token to indicate that the wavelength has been reserved;
   passing the token to an adjacent downstream node of the optical ring network; and
   establishing, responsive to selection of the request, the lightpath between the source node and the destination node.

2. The method of claim 1, wherein the step of establishing further comprises the step of:
   updating the token to indicate the wavelength supporting the lightpath is unavailable; and
   forwarding the updated token to the destination node.

3. The method of claim 1, wherein the step of selecting further comprises a best fit window protocol, the best fit window protocol comprising the steps of:
   comparing the space available on the wavelength to the plurality of lightpath requests within the best fit window of the queue of the source node, wherein the window size is reconfigurable; and
   selecting a request having a longest span from the queue that fits within the space available on the wavelength.

4. The method of claim 3, wherein the step of selecting further comprises the steps of:
   determining whether a soft deadline associated with any lightpath request in the queue has expired;
   removing any said lightpath request having an expired soft deadline from the best fit window and inserting said lightpath request in the queue; and
   selecting the lightpath request in the queue having an oldest expired soft deadline that fits within the space available on the wavelength.

5. The method of claim 1, wherein the destination node is identical to at least one of the adjacent upstream node and the adjacent downstream node.

6. The method of claim 1, wherein the optical ring network comprises a Wavelength Division Multiplexing (WDM) ring network.

7. The method of claim 1, wherein the token is further adapted to free said reserved wavelength.

8. The method of claim 1, wherein the token bearing the availability information related to the available space within the wavelength achieves a tell-and-go reservation mechanism adapted to transmit data packets immediately after the wavelength has been reserved and without awaiting acknowledgements.

9. A method for establishing lightpaths within an optical ring network, comprising:

storing a plurality of requests for a lightpath between a source node in the optical ring network and a destination node in the optical ring network in a queue at the source node;
circulating on the optical ring network, a plurality of tokens, the plurality of tokens comprising a token associated with a wavelength;
wherein the token is adapted to bear availability information related to an available space within the wavelength and broadcast the availability information across the optical ring network;
receiving the token at the source node;
determining whether a soft deadline associated with any said lightpath request in a queue at the source node has expired;
if a soft deadline has expired, selecting the lightpath request having an oldest expired soft deadline that fits with an available space within the wavelength;
if a soft deadline has not expired, comparing a space available on a wavelength to each lightpath request within the queue of the source node;
selecting the lightpath request having a longest span from the queue that fits within the available space on the wavelength; and
updating the token to indicate that the wavelength has been reserved;
passing the token to an adjacent downstream node of the optical ring network; and
establishing the lightpath between the source node and the destination node.

10. The method of claim 9, wherein the step of establishing further comprises the step of:
updating the token to indicate the wavelength supporting the lightpath is unavailable; and
forwarding the updated token to the destination node.

11. The method of claim 9, further including the step of storing the lightpath request in the queue of the source node.

12. The method of claim 9, wherein the optical ring network comprises a Wavelength Division Multiplexing (WDM) ring network.

13. The method of claim 9, wherein the token is further adapted to free said reserved wavelength.

14. The method of claim 9, wherein the token bearing availability information related to the available space within the wavelength achieves a tell-and-go reservation mechanism adapted to transmit data packets immediately after the wavelength has been reserved and without awaiting acknowledgements.

15. An optical ring network, comprising:
a source node;
a destination node interconnected with the source node by a plurality of wavelengths, each wavelength associated with a particular channel;
a plurality of tokens adapted to continuously circulate on the optical ring network, the plurality of tokens comprising a token
associated with a wavelength of the plurality of wavelengths, the token indicating availability of the associated wavelength for supporting a lightpath and broadcasting the availability across the optical ring network; and
wherein the source node is configured to:
store a request for a lightpath between the source node in the optical ring network and the destination node in the optical ring network at the source node;
receive the token at the source node indicating an available space within the wavelength;
wherein the source node is further configured to:
select a lightpath request from a the queue of the source node;
update the token to indicate that the wavelength has been reserved;
pass the token to an adjacent downstream node of the optical ring network; and
establish, responsive to selection of the request, the lightpath between the source node and the destination node.

16. The optical ring network of claim 15, wherein the source node is further configured to:
update the token to indicate the wavelength supporting the lightpath is unavailable; and
forward the updated token to the destination node.

17. The optical ring network of claim 15, wherein the source node is further configured to utilize a best fit window protocol, the best fit window protocol being adapted to:
compare the space available on the wavelength to each said lightpath request within the best fit window of the queue of the source node, wherein the window size is reconfigurable; and
selecting a request having a longest span from the queue that fits within the space available on the wavelength.

18. The optical ring network of claim 15, wherein the source node is further configured to:
determine whether a soft deadline associated with a lightpath request in the queue at the source node has expired;
removing any said lightpath request having an expired soft deadline from the best fit window and inserting said lightpath request in the queue; and
selecting the lightpath request in the queue having an oldest expired soft deadline that fits within the space available on the wavelength.

19. The optical ring network of claim 15, wherein the source node is further configured to store the lightpath request in the queue of the source node.

20. The optical ring network of claim 15, wherein the optical ring network comprises a Wavelength Division Multiplexing (WDM) ring network.

21. The optical ring network of claim 15, wherein the token is further adapted to free said reserved wavelength.

22. The optical ring network of claim 15, wherein the token bearing the availability of the associated wavelength achieves a tell-and-go reservation mechanism adapted to transmit data packets immediately after the wavelength has been reserved and without awaiting acknowledgements.

23. A node within an optical communication ring network, comprising:
a transmitter for transmitting to other nodes within the optical communication ring network;
a receiver for receiving data from the other nodes within the optical communication ring network;
a queue for storing requests for connections between the node and a destination node; and
a controller, said controller configured to:
store a request for a lightpath in the queue between the node in the optical communication ring network and the destination node in the optical communication ring network;
receive a token from the receiver indicating an available space within a wavelength;
wherein the token is adapted to bear availability information related to the available space within the wavelength and broadcast the availability information across the optical communication ring network;

wherein the controller is further configured to:
update the token to indicate that the wavelength associated with the token has been reserved;
pass the token to an adjacent downstream node of the optical communication ring network; and
select the request for the lightpath from the queue responsive to the token; and
establish, responsive to selection of the request, the lightpath between the node and the destination node using the transmitter.

24. The node of claim 23, wherein the controller is configured to:
update the token to indicate the wavelength supporting the lightpath is unavailable; and
forward the updated token to the destination node using the transmitter.

25. The node of claim 23, wherein the controller is further configured to:
utilize a best fit window protocol, the best fit window protocol being adapted to compare the space available on a channel to each request within the queue; and
select a request having a longest span from the queue that fits within the space available on the wavelength.

26. The node of claim 23, wherein the controller is further configured to:
determine whether a soft deadline associated with any request in the queue has expired;
remove any request having an expired soft deadline from a best fit window and inserting said request in the queue; and
select an oldest removed request that fits within the space available on the wavelength.

27. The node of claim 23, wherein the optical ring network comprises a Wavelength Division Multiplexing (WDM) ring network.

28. The node of claim 23, wherein the token is further adapted to free said reserved wavelength.

29. The node of claim 23, wherein the token indicating the available space within the wavelength achieves a tell-and-go reservation mechanism adapted to transmit data packets immediately after the wavelength has been reserved and without awaiting acknowledgements.

* * * * *

UNITED STATES PATENT AND TRADEMARK OFFICE
CERTIFICATE OF CORRECTION

PATENT NO. : 7,092,633 B2  Page 1 of 1
APPLICATION NO. : 10/003005
DATED : August 15, 2006
INVENTOR(S) : Andrea Fumagalli et al.

It is certified that error appears in the above-identified patent and that said Letters Patent is hereby corrected as shown below:

Column 2, line 2,                Replace "from a the queue"
Claim 15                         With --from a queue--

Signed and Sealed this

Sixth Day of March, 2007

JON W. DUDAS
*Director of the United States Patent and Trademark Office*